United States Patent
Hilton et al.

(10) Patent No.: US 9,652,245 B2
(45) Date of Patent: May 16, 2017

(54) BRANCH PREDICTION FOR INDIRECT JUMPS BY HASHING CURRENT AND PREVIOUS BRANCH INSTRUCTION ADDRESSES

(75) Inventors: Andrew D. Hilton, Durham, NC (US); Brian M. Rogers, Durham, NC (US); Kenichi Tsuchiya, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1216 days.

(21) Appl. No.: 13/550,129

(22) Filed: Jul. 16, 2012

(65) Prior Publication Data

US 2014/0019737 A1    Jan. 16, 2014

(51) Int. Cl.
*G06F 9/38* (2006.01)
*G06F 9/30* (2006.01)

(52) U.S. Cl.
CPC ........ *G06F 9/3844* (2013.01); *G06F 9/30058* (2013.01); *G06F 9/3806* (2013.01)

(58) Field of Classification Search
CPC .............................. G06F 9/3806; G06F 9/3844
See application file for complete search history.

(56) References Cited

U.S. PATENT DOCUMENTS

| | | | |
|---|---|---|---|
| 6,272,623 B1 * | 8/2001 | Talcott | G06F 9/3848 712/239 |
| 7,409,535 B2 | 8/2008 | Park et al. | |
| 7,797,521 B2 | 9/2010 | Eickemeyer et al. | |
| 7,900,026 B2 | 3/2011 | Park et al. | |
| 8,099,586 B2 | 1/2012 | Chou et al. | |
| 2009/0037709 A1 * | 2/2009 | Ishii | G06F 9/3844 712/240 |
| 2011/0078425 A1 | 3/2011 | Shah et al. | |
| 2011/0119472 A1 | 5/2011 | Amano | |
| 2011/0296206 A1 | 12/2011 | Henry et al. | |
| 2011/0320787 A1 | 12/2011 | Dieffenderfer et al. | |
| 2011/0320792 A1 | 12/2011 | Bonanno et al. | |
| 2013/0332715 A1 * | 12/2013 | Bonanno | G06F 9/3806 712/240 |

OTHER PUBLICATIONS

Xie, et al., "TAP Prediction: Reusing Conditional Branch Predictor for Indirect Branches with Target Address Pointers", 2011 IEEE 29th International Conference on Computer Design (ICCD), Oct. 2011, pp. 119-126, IEEE Computer Society, Los Alamitos, CA, USA, Digital Object Identifier: 10.1109/ICCD.2011.6081386.

(Continued)

*Primary Examiner* — Jacob A Petranek
(74) *Attorney, Agent, or Firm* — Brandon C. Kennedy; Jason A. Friday; Kennedy Lenart Spraggins LLP

(57) ABSTRACT

Branch prediction for indirect jumps, including: receiving, by a branch prediction module, a branch address for each of a plurality of executed branch instructions; receiving, by the branch prediction module, an instruction address of a current branch instruction; creating, by the branch prediction module, an execution path identifier in dependence upon the branch address for each of the plurality of executed branch instructions and the instruction address of the current branch instruction; and searching, by the branch prediction module, a branch prediction table for an entry that matches the execution path identifier.

18 Claims, 4 Drawing Sheets

(56) References Cited

OTHER PUBLICATIONS

Farooq, et al., "Value Based BTB Indexing for Indirect Jump Prediction", 2010 IEEE 16th International Symposium on High Performance Computer Architecture (HPCA), Jan. 2010, pp. 1-11, IEEE Computer Society, Los Alamitos, CA, USA, Digital Object Identifier: 10.1109/HPCA.2010.5416659.

Jiménez, "Piecewise Linear Branch Prediction", Proceedings of the $32^{nd}$ International Symposium on Computer Architecture (ISCA '05), Jun. 2005, pp. 382-393, IEEE Computer Society, Los Alamitos, CA, USA, Digital Object Identifier : 10.1109/ISCA.2005.40.

Plusquellic, "Dynamic Branch Prediction", Advanced Computer Architecture course CMSC 611, Chapter 4 Part 5 slide, The University of New Mexico Electrical & Computer Engineering, www.ece.unm.edu [online], accessed May 3, 2012, 10 pages, URL: http://www.ece.unm.edu/~jimp/611/slides/chap4_5.html.

Wikipedia, "Branch predictor", http://en.wikipedia.org [online], accessed May 3, 2012, 7 pages, URL: http://en.wikipedia.org/wiki/Branch_predictor.

\* cited by examiner

BRANCH PREDICTION FOR INDIRECT JUMPS BY HASHING CURRENT AND PREVIOUS BRANCH INSTRUCTION ADDRESSES

BACKGROUND OF THE INVENTION

Field of the Invention

The field of the invention is data processing, or, more specifically, methods, apparatus, and products for branch prediction for indirect jumps.

Description of Related Art

Branch prediction is a critical component in the microarchitecture of modern high-performance processors. The branch prediction unit of a processor is tasked with the job of keeping the processor pipeline supplied with useful instructions to execute, preventing bubbles in the pipeline between executed instructions which are costly to performance. At a high level, branch prediction involves the prediction of whether a branch instruction in an executing program will be taken or not taken, and if the branch is taken, a prediction of what the target instruction address of the branch instruction will be. A highly accurate branch predictor enables the processor to fetch a continuous stream of good instructions to supply to the CPU pipeline, even in the presence of branch instructions which change the control flow of the executing application.

SUMMARY OF THE INVENTION

Methods, apparatus, and products for branch prediction for indirect jumps, including: receiving, by a branch prediction module, a branch address for each of a plurality of executed branch instructions; receiving, by the branch prediction module, an instruction address of a current branch instruction; creating, by the branch prediction module, an execution path identifier in dependence upon the branch address for each of the plurality of executed branch instructions and the instruction address of the current branch instruction; and searching, by the branch prediction module, a branch prediction table for an entry that matches the execution path identifier.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
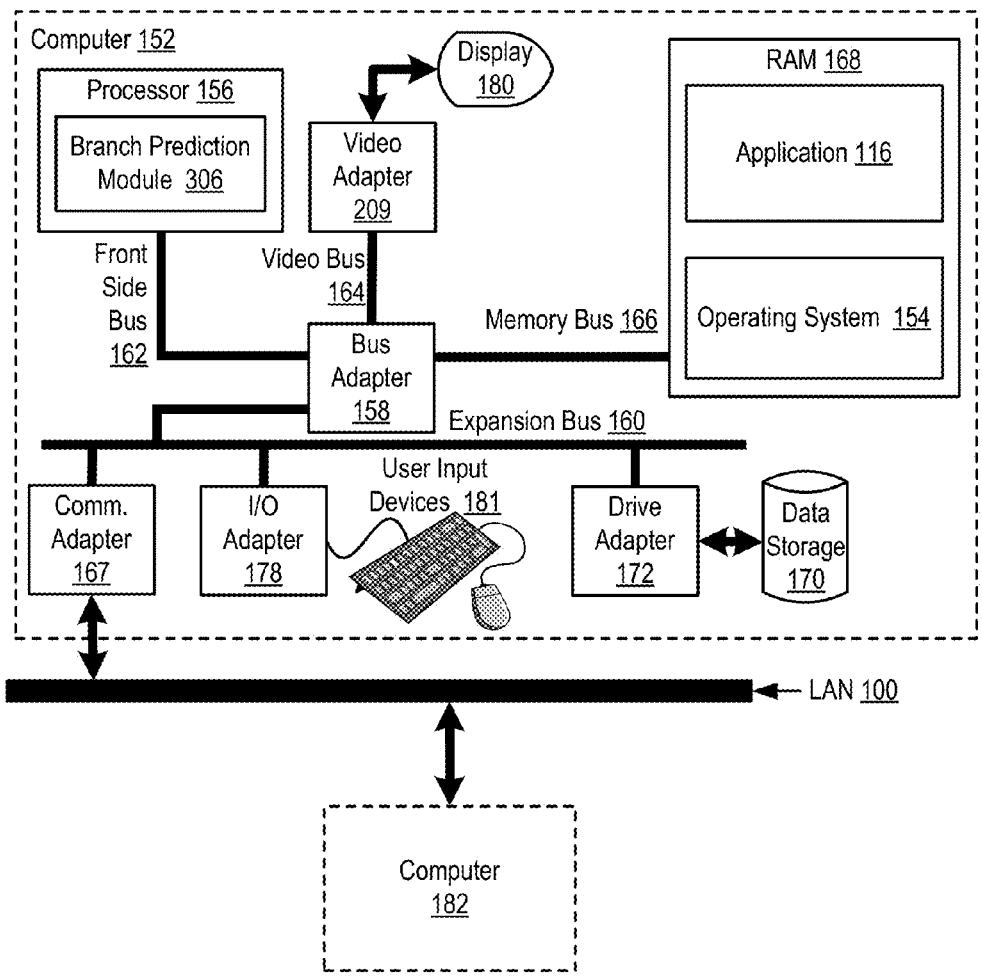
FIG. 1 sets forth a block diagram of automated computing machinery comprising an example computer useful in branch prediction for indirect jumps according to embodiments of the present invention.

Example methods, apparatus, and products for branch prediction for indirect jumps in accordance with the present invention are described with reference to the accompanying drawings, beginning with FIG. 1. FIG. 1 sets forth a block diagram of automated computing machinery comprising an example computer (152) useful in branch prediction for indirect jumps according to embodiments of the present invention. An indirect jump represents a particular type of branch instruction. Branch instructions represent a sequence of code in a computer program whose execution is conditional. A branch instruction can include a conditional statement, such that a particular sequence of computer program instructions are executed if the condition is satisfied. Alternatively, if the condition is not satisfied, an alternative sequence of computer program instructions is executed. Examples of such branch instructions can include an if-then statement, a while loop, and so on.

Unlike many branch instructions, an indirect jump does not specify the address of a computer program instruction that is to be executed if the condition is satisfied. Instead, an indirect jump specifies a location at which the address for a computer program instruction that is to be executed can be found. For example, an indirect jump may identify a particular register in a computer processor that includes the address for a computer program instruction that is to be executed if a particular condition is met. In such an example, if it is determined that the particular condition is met, the computer processor may subsequently retrieve the address contained in the particular register associated with the indirect jump and execute the instruction at the address contained in the register. Examples of an indirect jump can include a branch-to-count instruction, a jump and link instruction, and so on.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The computer processor (156) of FIG. 1 includes a branch prediction module (306). The branch prediction module (306) may be embodied, for example, as a digital circuit within the computer processor (156). The branch prediction module (306) of FIG. 1 attempts to identify which instructions will be executed as the result of a branch instruction, so that the instructions can be fetched prior to their execution, thereby keeping the computer processor's instruction pipeline full.

Consider an example in which the branch instruction is an if-then-else statement. In such an example, a condition contained in the 'if' statement is evaluated by the computer processor executing the 'if' statement. If the condition is satisfied, the computer program instructions contained in the 'then' statement are subsequently fetched and executed. If the condition is not satisfied, the computer program instructions contained in the 'else' statement are subsequently fetched and executed. In both cases, without a branch prediction module (306), the computer program instructions that will be executed after the 'if' statement cannot be fetched until the 'if' statement is evaluated. As such, the computer processor may be idle until the computer program instructions that will be executed after the 'if' statement have been fetched and decoded, thereby causing the computer processor to experience a decrease in performance as the computer processor is not executing instructions during each available clock cycle. Through the use of a branch predictor such as the branch prediction module (306), the branch prediction module (306) may make an informed guess regarding which branch (e.g., the 'then' branch or the 'else' branch) will be taken and may fetch the instructions contained in the selected branch prior to executing the branch instruction. If the branch predictor has guessed correctly, the instructions to be executed after the evaluation of the branch instruction will be immediately available for execution, such that the computer processor does not have to wait for the instructions to be fetched and decoded.

The branch prediction module (306) of FIG. 1 can carry out branch prediction for indirect jumps by receiving a branch address for each of a plurality of executed branch instructions. The branch address for a particular executed branch instruction represents the address of the branch instruction itself. For example, the branch address for a branch-to-count instruction represents the address of the branch-to-count instruction itself—not the address of an instruction to be executed as the result of evaluating the branch-to-count instruction. In such an example, branch addresses for a predetermined number of previously executed branch instructions may be stored in memory and subsequently retrieved by the branch prediction module (306).

The branch prediction module (306) of FIG. 1 can further carry out branch prediction for indirect jumps by receiving an instruction address of a current branch instruction. The current branch instruction represents a branch instruction that has not been executed by the computer processor but is available for execution by the computer processor. Receiving an instruction address of the current branch instruction may be carried out, for example, by receiving the current branch instruction itself, by identifying that an instruction at a particular address that is to be executed is a branch instruction, and so on.

The branch prediction module (306) of FIG. 1 can further carry out branch prediction for indirect jumps by creating an execution path identifier in dependence upon the branch address for each of the plurality of executed branch instructions and the instruction address of the current branch instruction. The execution path identifier is a value that represents the sequence of branch instructions that are executed during the execution of a particular computer program. Creating the execution path identifier may be carried out by combining the branch address for each of the plurality of executed branch instructions and the instruction address of the current branch instruction into a single value, for example, through the use of an exclusive or operation, through the use of a hash function, and so on.

The branch prediction module (306) of FIG. 1 can further carry out branch prediction for indirect jumps by searching a branch prediction table for an entry that matches the execution path identifier. The branch prediction table is a data structure that includes information for predicting which branch will be taken in response to executing the current branch instruction. In particular, the branch prediction table associates one or more execution path identifiers, which is associated with and created using the instruction address of the current branch instruction, with a predicted target address for the branch to be taken as a result of the current branch instruction.

Stored in RAM (168) is an application (116), a module of computer program instructions for carrying out user-level data processing tasks. Examples of such applications include word processing applications, spreadsheet applications, multimedia library and playback applications, presentation applications, database applications, and so on. Also stored in RAM (168) is an operating system (154). Operating systems useful branch prediction for indirect jumps according to embodiments of the present invention include UNIX™, Linux™, Microsoft XP™, AIX™, IBM's i5/OS™, and others as will occur to those of skill in the art. The operating system (154) and application (116) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for branch prediction for indirect jumps according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for branch prediction for indirect jumps according to embodiments of the present invention include modems for wired dial-up communications, Ethernet (IEEE 802.3) adapters for wired data communications network communications, and 802.11 adapters for wireless data communications network communications.

Figure 2:
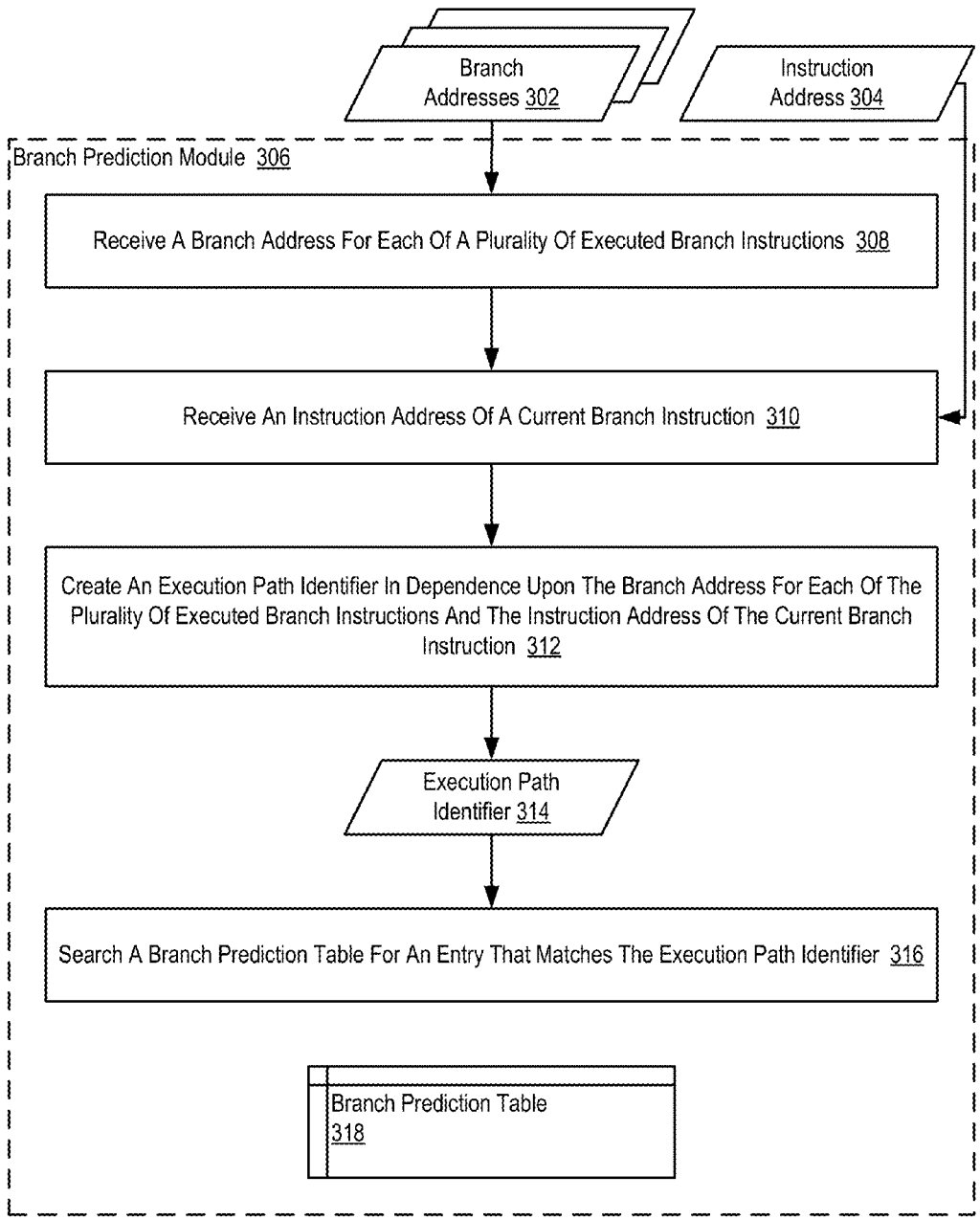
FIG. 2 sets forth a flow chart illustrating an example method for branch prediction for indirect jumps according to embodiments of the present invention.

For further explanation, FIG. 2 sets forth a flow chart illustrating an example method for branch prediction for indirect jumps according to embodiments of the present invention. In the example method of FIG. 2, an indirect jump represents a particular type of branch instruction. Branch instructions represent a sequence of code in a computer program whose execution is conditional. A branch instruction can include a conditional statement, such that a particular sequence of computer program instructions are executed if the condition is satisfied. Alternatively, if the condition is not satisfied, an alternative sequence of computer program instructions is executed. Examples of such branch instructions can include an if-then statement, a while loop, and so on.

Unlike many branch instructions, an indirect jump does not specify the address of a computer program instruction that is to be executed if the condition is satisfied. Instead, an indirect jump specifies a location at which the address for a computer program instruction that is to be executed can be found. For example, an indirect jump may identify a particular register in a computer processor that includes the address for a computer program instruction that is to be executed if a particular condition is met. In such an example, if it is determined that the particular condition is met, the computer processor may subsequently retrieve the address contained in the particular register associated with the indirect jump and execute the instruction at the address contained in the register. Examples of an indirect jump can include a branch-to-count instruction, a jump and link instruction, and so on.

In the example method of FIG. 2, branch prediction for indirect jumps according to embodiments of the present invention is carried out by a branch prediction module (306). The branch prediction module (306) of FIG. 2 may be embodied, for example, as a digital circuit within a computer processor. The branch prediction module (306) of FIG. 2 attempts to identify which instructions will be executed as the result of a branch instruction, so that the instructions can be fetched prior to their execution, thereby keeping the computer processor's instruction pipeline full.

Consider an example in which the branch instruction is an if-then-else statement. In such an example, a condition contained in the 'if' statement is evaluated by the computer processor executing the 'if' statement. If the condition is satisfied, the computer program instructions contained in the 'then' statement are subsequently fetched and executed. If the condition is not satisfied, the computer program instructions contained in the 'else' statement are subsequently fetched and executed. In both cases, without a branch prediction module (306), the computer program instructions that will be executed after the 'if' statement cannot be fetched until the 'if' statement is evaluated. As such, the computer processor may be idle until the computer program instructions that will be executed after the 'if' statement have been fetched and decoded, thereby causing the computer processor to experience a decrease in performance as the computer processor is not executing instructions during each available clock cycle. Through the use of a branch predictor such as the branch prediction module (306), the branch prediction module (306) may make an informed guess regarding which branch (e.g., the 'then' branch or the 'else' branch) will be taken and may fetch the instructions contained in the selected branch prior to executing the branch instruction. If the branch predictor has guessed correctly, the instructions to be executed after the evaluation of the branch instruction will be immediately available for execution, such that the computer processor does not have to wait for the instructions to be fetched and decoded.

The example method of FIG. 2 includes receiving (308), by a branch prediction module (306), a branch address (302) for each of a plurality of executed branch instructions. In the example method of FIG. 2, the branch address (302) for a particular executed branch instruction represents the address of the branch instruction itself. For example, the branch address (302) for a branch-to-count instruction represents the address of the branch-to-count instruction itself—not the address of an instruction to be executed as the result of evaluating the branch-to-count instruction. In such an example, branch addresses (302) for a predetermined number of previously executed branch instructions may be stored in memory and subsequently retrieved by the branch prediction module (306).

For example, a computer processor that includes the branch prediction module (306) may dedicate four registers to maintaining the addresses of previously executed branch instructions. In such an example, each time a branch instruction is encountered and executed, the oldest entry in the four registers may be replaced by the address of the encountered and executed branch instruction. In such a way, the four registers would always contain the addresses of the four most recent branch instructions that were executed. Receiving (308) a branch address (302) for each of a plurality of executed branch instructions could therefore be carried out by the branch prediction module (306) fetching the value contained in the four dedicated registers. The example method of FIG. 2 also includes receiving (310), by the branch prediction module (306), an instruction address (304) of a current branch instruction. In the example method of FIG. 2, a current branch instruction represents a branch instruction that has not been executed by the computer processor but is available for execution by the computer processor. In the example method of FIG. 2, receiving (310) an instruction address (304) of the current branch instruction may be carried out, for example, by receiving the current branch instruction itself, by identifying that an instruction at a particular address that is to be executed is a branch instruction, and so on.

The example method of FIG. 2 also includes creating (312), by the branch prediction module (306), an execution path identifier (314) in dependence upon the branch address (302) for each of the plurality of executed branch instructions and the instruction address (304) of the current branch instruction. In the example method of FIG. 2, the execution path identifier (314) is a value that represents the sequence of branch instructions that are executed during the execution of a particular computer program. Creating the execution path identifier (314) may be carried out by combining the branch address (302) for each of the plurality of executed branch instructions and the instruction address (304) of the current branch instruction into a single value, for example, through the use of an exclusive or operation, through the use of a hash function, and so on.

The example method of FIG. 2 also includes searching (316), by the branch prediction module (306), a branch prediction table (318) for an entry that matches the execution path identifier (314). In the example method of FIG. 2, the branch prediction table (318) is a data structure that includes information for predicting which branch will be taken in response to executing the current branch instruction. In particular, the branch prediction table (318) associates one or more execution path identifiers (314), which is associated with and created using the instruction address (304) of the current branch instruction, with a predicted target address for the branch to be taken as a result of the current branch instruction. Table 1 sets forth an example of a branch prediction table (318):

TABLE 1

Branch Prediction Table

| Execution Path Identifier | Target Address |
|---|---|
| 101101000100101 | 9AF3 |
| 011100101101001 | D2E8 |

TABLE 1-continued

Branch Prediction Table

| Execution Path Identifier | Target Address |
|---|---|
| 110110100010100 | 45A1 |
| 001011101100101 | BF67 |

The example branch prediction table (318) illustrated in Table 1 includes two columns. The column that is labeled 'Execution Path Identifier' includes values that are generated by combining the branch address for each of the plurality of previously executed branch instructions and the instruction address of a current branch instruction. Each 'Execution Path Identifier' value for a particular entry in the branch prediction table is therefore determined based on the instruction address of a current branch instruction that is associated with the entry and also based on the branch addresses of a predetermined number of branch instructions that were executed prior to encountering the current branch instruction that is associated with the entry in the branch prediction table. The column that is labeled 'Target Address' includes a value that represents the predicted target address for the next instruction to execute after executing the current branch instruction that is associated with the entry in the branch prediction table. In the example method of FIG. 2, searching (316) a branch prediction table (318) for an entry that matches the execution path identifier (314) may therefore be carried out by comparing the execution path identifier (314) that was created (312) with the 'Execution Path Identifier' of each entry in the branch prediction table (318).

Figure 3:
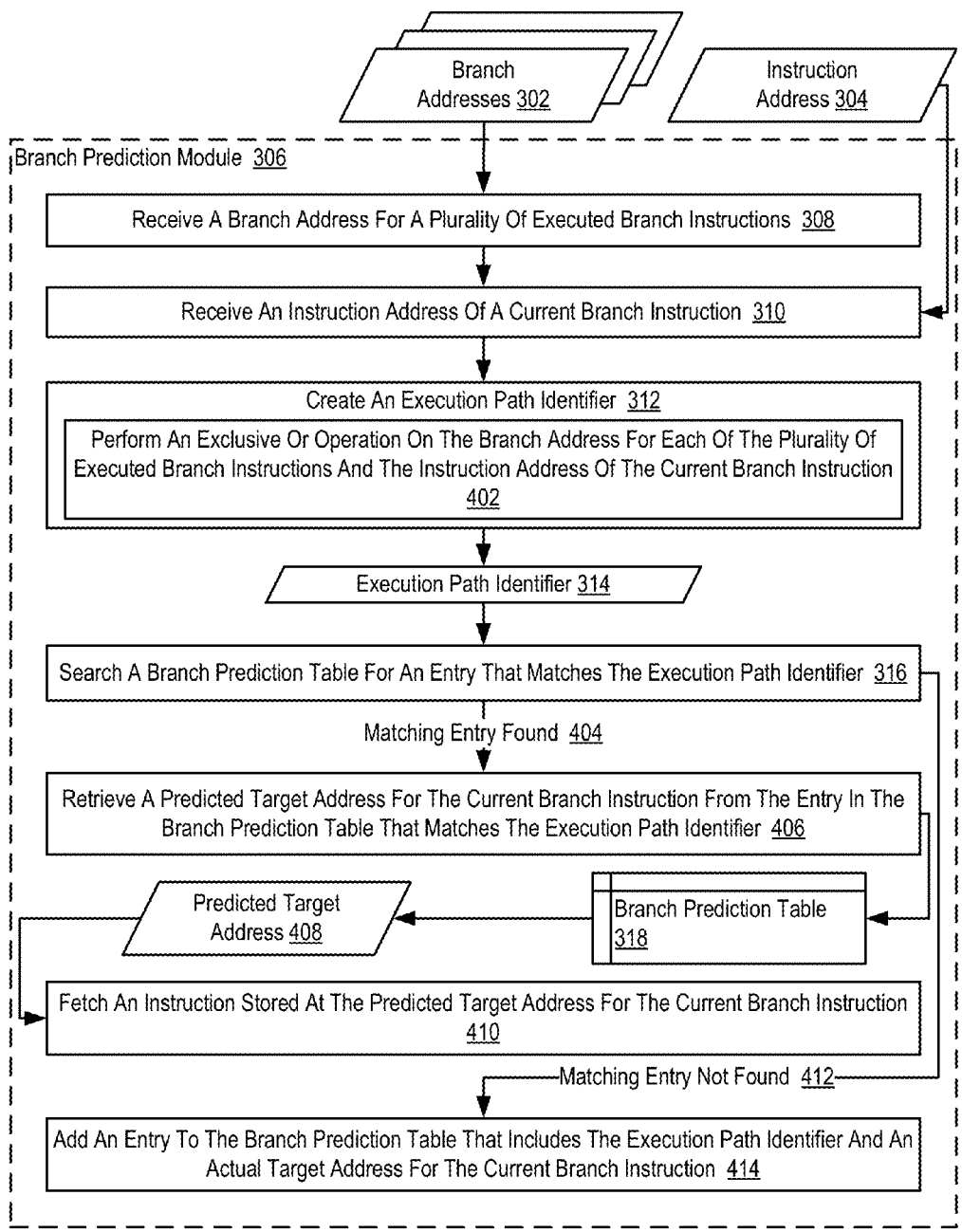
FIG. 3 sets forth a flow chart illustrating a further example method for branch prediction for indirect jumps according to embodiments of the present invention.

For further explanation, FIG. 3 sets forth a flow chart illustrating a further example method for branch prediction for indirect jumps according to embodiments of the present invention. The example method of FIG. 3 is similar to the example method of FIG. 2, as it also includes receiving (308) a branch address (302) for each of a plurality of executed branch instructions, receiving (310) an instruction address (304) of a current branch instruction, creating (312) an execution path identifier (314) in dependence upon the branch address (302) for each of the plurality of executed branch instructions and the instruction address (304) of the current branch instruction, and searching (316) a branch prediction table (318) for an entry that matches the execution path identifier (314).

In the example method of FIG. 3, creating (312) an execution path identifier (314) in dependence upon the branch address (302) for each of the plurality of executed branch instructions and the instruction address (304) of the current branch instruction includes performing (402), by the branch prediction module (306), an exclusive or operation on the branch address (302) for each of the plurality of executed branch instructions and the instruction address (304) of the current branch instruction. An exclusive or operation is a logical operation that takes two or more operands as input. Each operand is compared bit-by-bit. In an exclusive or operation, a logical 0 is produced when none of an even number of the input values are 1. A logical 1 is produced when an odd number of the input values are 1. Performing (402) an exclusive or operation on the branch address (302) for each of the plurality of executed branch instructions and the instruction address (304) of the current branch instruction may be carried out, for example, by performing an exclusive or operation using the bit representations of the branch address (302) for each of the plurality of executed branch instructions and the bit representation of the instruction address (304) of the current branch instruction as operands for the exclusive or operation.

The example method of FIG. 3 also includes, in response to failing (412) to find an entry in the branch prediction table (318) that matches the execution path identifier (314), adding (414) an entry to the branch prediction table (318) that includes the execution path identifier (314) and an actual target address for the current branch instruction. In the example method of FIG. 3, the actual target address for the current branch instruction represents the address of the next instruction that is executed after executing the current branch instruction. That is, the actual target address for the current branch instruction represents the address of the instruction that is executed as a result of branching after executing the current branch instruction.

In the example method of FIG. 3, failing (412) to find an entry in the branch prediction table (318) that matches the execution path identifier (314) indicates that the current execution path (e.g., the current branch instruction preceded by a specific sequence of previously executed branch instructions) has not been previously encountered and executed. As such, the branch prediction module (306) has no reliable way of predicting the address of the instruction that will be executed after executing the current branch instruction. In such an example, the branch prediction module (306) will not fetch an instruction prior to executing the current branch instruction. Instead, the current branch instruction will be executed, causing the actual target address for the current branch instruction to be identified. The branch prediction module (306) will subsequently add (414) an entry to the branch prediction table (318) that includes the execution path identifier (314) and an actual target address for the current branch instruction, so that the address of a next instruction to execute can be retrieved if the current execution path is encountered at a later time.

The example method of FIG. 3 also includes, in response to finding (404) an entry in the branch prediction table (318) that matches the execution path identifier (314), retrieving (406) a predicted target address (408) for the current branch instruction from the entry in the branch prediction table (318) that matches the execution path identifier (314). In the example method of FIG. 3, the predicted target address (408) for the current branch instruction represents the address of the next instruction that the branch prediction module (306) predicts will be executed after the current branch instruction is executed. That is, the predicted target address (408) for the current branch instruction represents that address of the next instruction that the branch prediction module (306) predicts will be executed as a result of the branching that will occur as the result of executing the current branch instruction.

In the example method of FIG. 3, finding (404) an entry in the branch prediction table (318) that matches the execution path identifier (314) indicates that the current execution path (e.g., the current branch instruction preceded by a specific sequence of previously executed branch instructions) has been previously encountered and executed. As such, the address of the instruction that was executed after previously executing the current execution path can be retrieved (406) from the entry in the branch prediction table (318) that matches the execution path identifier (314). The retrieved address represents a predicted target address (408) for the current branch instruction.

The example method of FIG. 3 also includes, in response to finding (404) an entry in the branch prediction table (318) that matches the execution path identifier (314), fetching (410) an instruction stored at the predicted target address (408) for the current branch instruction. In the example of FIG. 3, fetching (410) an instruction stored at the predicted target address (408) for the current branch instruction can also include decoding the instruction stored at the predicted target address (408) for the current branch instruction, as well as performing any other required steps that prepare the instruction stored at the predicted target address (408) for execution.

Figure 4:
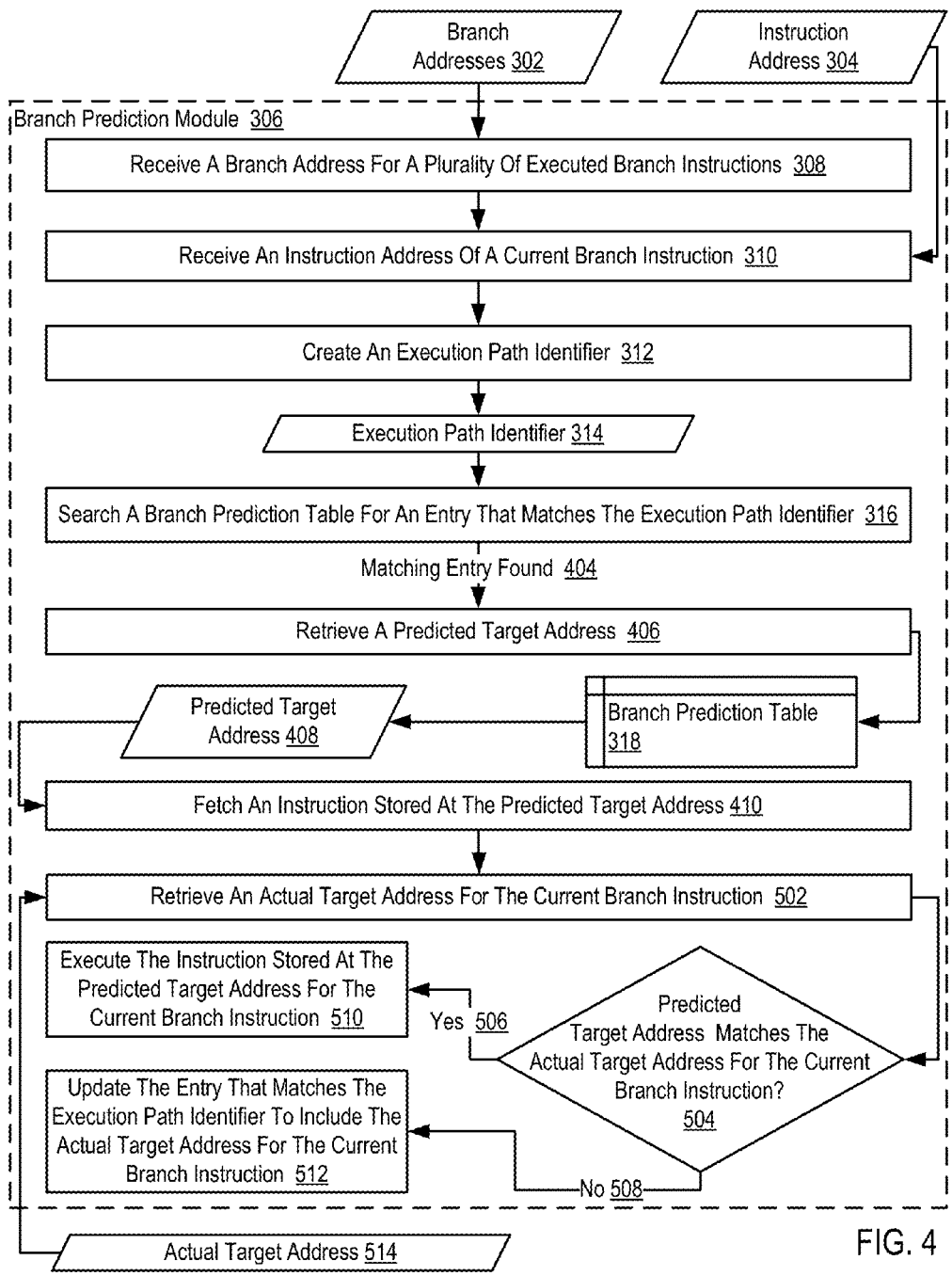
FIG. 4 sets forth a flow chart illustrating a further example method for branch prediction for indirect jumps according to embodiments of the present invention.

For further explanation, FIG. 4 sets forth a flow chart illustrating a further example method for branch prediction for indirect jumps according to embodiments of the present invention. The example method of FIG. 4 is similar to the example method of FIG. 2, as it also includes receiving (308) a branch address (302) for each of a plurality of executed branch instructions, receiving (310) an instruction address (304) of a current branch instruction, creating (312) an execution path identifier (314) in dependence upon the branch address (302) for each of the plurality of executed branch instructions and the instruction address (304) of the current branch instruction, and searching (316) a branch prediction table (318) for an entry that matches the execution path identifier (314).

The example method of FIG. 4 includes retrieving (502), by the branch prediction module (306), an actual target address (514) for the current branch instruction. In the example method of FIG. 4, retrieving (502) an actual target address (514) for the current branch instruction may be carried out after the current branch instruction has been executed. Consider an example in which the current branch instruction is a branch-to-count instruction in which a condition is evaluated and an address is subsequently read from a location in memory, where the address represents the address of the next instruction to execute. In such an example, the actual target address (514) for the current branch instruction is retrieved (502) by the branch prediction module (318) when the address read from the location in memory in response to evaluating the condition.

The example method of FIG. 4 also includes determining (504), by the branch prediction module (306), whether the predicted target address (408) for the current branch instruction matches the actual target address (514) for the current branch instruction. As described above, the predicted target address (408) for the current branch instruction represents the address of the next instruction that the branch prediction module (306) predicts will be executed after the current branch instruction is executed. That is, the predicted target address (408) for the current branch instruction represents that address of the next instruction that the branch prediction module (306) predicts will be executed as a result of the branching that will occur as the result of executing the current branch instruction. In order to verify that the predicted target address (408) represents a correct prediction of the address of the next instruction to be executed after the current branch instruction is executed, the predicted target address (408) can be compared to the actual target address (514) for the current branch instruction to determine (504) if the addresses match.

The example method of FIG. 4 also includes, in response to determining that the predicted target address (408) for the current branch instruction matches (506) the actual target address (514) for the current branch instruction, executing (510) the instruction stored at the predicted target address (408) for the current branch instruction. As described above, the branch prediction module (318) can fetch (410) an instruction stored at the predicted target address (408) for the current branch instruction in an attempt to keep the instruction pipeline full for a computer processor. If the branch prediction module (318) determines that the predicted target address (408) for the current branch instruction matches (506) the actual target address (514) for the current branch instruction, the computer processor is therefore free to execute (510) the instruction stored at the predicted target address (408) for the current branch instruction.

The example method of FIG. 4 also includes, in response to determining that the predicted target address (408) for the current branch instruction does not (508) match the actual target address (514) for the current branch instruction, updating (512) the entry in the branch prediction table (318) that matches the execution path identifier (314) to include the actual target address (514) for the current branch instruction. As described above, the branch prediction module (318) can fetch (410) an instruction stored at the predicted target address (408) for the current branch instruction in an attempt to keep the instruction pipeline full for a computer processor. If the branch prediction module (318) determines that the predicted target address (408) for the current branch instruction does not (508) match the actual target address (514) for the current branch instruction, the computer processor should not execute the instruction stored at the predicted target address (408) for the current branch instruction. Instead, the branch prediction module (318) can update (512) the entry in the branch prediction table (318) that matches the execution path identifier (314) to include the actual target address (514) for the current branch instruction. In such a way, if the execution path identified by the execution path identifier (314) is encountered at a later point in time, the branch prediction module (318) can utilize the actual target address (514) for the current branch instruction in future predictions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
receiving a branch address for each of a plurality of executed branch instructions, wherein the branch address for each of a plurality of executed branch instructions is a complete branch instruction address;
receiving an instruction address of a current branch instruction;
creating an execution path identifier in dependence upon the branch address for each of the plurality of executed branch instructions and the instruction address of the current branch instruction including performing an exclusive or operation on the branch address for each of the plurality of executed branch instructions and the instruction address of the current branch instruction; and
searching a branch prediction table for an entry that matches the execution path identifier.

2. The method of claim 1 further comprising, responsive to finding an entry in the branch prediction table that matches the execution path identifier:
retrieving a predicted target address for the current branch instruction from the entry in the branch prediction table that matches the execution path identifier; and
fetching an instruction stored at the predicted target address for the current branch instruction.

3. The method of claim 2 further comprising:
retrieving an actual target address for the current branch instruction; and
determining whether the predicted target address for the current branch instruction matches the actual target address for the current branch instruction.

4. The method of claim 3 further comprising, responsive to determining that the predicted target address for the current branch instruction matches the actual target address for the current branch instruction, executing the instruction stored at the predicted target address for the current branch instruction.

5. The method of claim 3 further comprising, responsive to determining that the predicted target address for the current branch instruction does not match the actual target address for the current branch instruction, updating the entry in the branch prediction table that matches the execution path identifier to include the actual target address for the current branch instruction.

6. The method of claim 1 further comprising, responsive to failing to find an entry in the branch prediction table that matches the execution path identifier, adding an entry to the branch prediction table that includes the execution path identifier and an actual target address for the current branch instruction.

7. An apparatus for branch prediction for indirect jumps, the apparatus comprising a computer processor, a computer memory operatively coupled to the computer processor, the computer memory having disposed within it computer program instructions that, when executed by the computer processor, cause the apparatus to carry out the steps of:
   receiving a branch address for each of a plurality of executed branch instructions, wherein the branch address for each of a plurality of executed branch instructions is a complete branch instruction address;
   receiving an instruction address of a current branch instruction;
   creating an execution path identifier in dependence upon the branch address for each of the plurality of executed branch instructions and the instruction address of the current branch instruction including performing an exclusive or operation on the branch address for each of the plurality of executed branch instructions and the instruction address of the current branch instruction; and
   searching a branch prediction table for an entry that matches the execution path identifier.

8. The apparatus of claim 7 further comprising computer program instructions that, when executed by the computer processor, cause the apparatus to carry out the steps of, responsive to finding an entry in the branch prediction table that matches the execution path identifier:
   retrieving a predicted target address for the current branch instruction from the entry in the branch prediction table that matches the execution path identifier; and
   fetching an instruction stored at the predicted target address for the current branch instruction.

9. The apparatus of claim 8 further comprising computer program instructions that, when executed by the computer processor, cause the apparatus to carry out the steps of:
   retrieving an actual target address for the current branch instruction; and
   determining whether the predicted target address for the current branch instruction matches the actual target address for the current branch instruction.

10. The apparatus of claim 9 further comprising computer program instructions that, when executed by the computer processor, cause the apparatus to carry out the steps of, responsive to determining that the predicted target address for the current branch instruction matches the actual target address for the current branch instruction, executing the instruction stored at the predicted target address for the current branch instruction.

11. The apparatus of claim 9 further comprising computer program instructions that, when executed by the computer processor, cause the apparatus to carry out the steps of, responsive to determining that the predicted target address for the current branch instruction does not match the actual target address for the current branch instruction, updating the entry in the branch prediction table that matches the execution path identifier to include the actual target address for the current branch instruction.

12. The apparatus of claim 7 further comprising computer program instructions that, when executed by the computer processor, cause the apparatus to carry out the steps of, responsive to failing to find an entry in the branch prediction table that matches the execution path identifier, adding an entry to the branch prediction table that includes the execution path identifier and an actual target address for the current branch instruction.

13. A computer program product disposed upon a non-transitory computer readable medium, the computer program product comprising computer program instructions that, when executed, cause a computer to carry out the steps of:
   receiving a branch address for each of a plurality of executed branch instructions, wherein the branch address for each of a plurality of executed branch instructions is a complete branch instruction address;
   receiving an instruction address of a current branch instruction;
   creating an execution path identifier in dependence upon the branch address for each of the plurality of executed branch instructions and the instruction address of the current branch instruction including performing an exclusive or operation on the branch address for each of the plurality of executed branch instructions and the instruction address of the current branch instruction; and
   searching a branch prediction table for an entry that matches the execution path identifier.

14. The computer program product of claim 13 further comprising computer program instructions that, when executed, cause the computer to carry out the steps of, responsive to finding an entry in the branch prediction table that matches the execution path identifier:
   retrieving a predicted target address for the current branch instruction from the entry in the branch prediction table that matches the execution path identifier; and
   fetching an instruction stored at the predicted target address for the current branch instruction.

15. The computer program product of claim 14 further comprising computer program instructions that, when executed, cause the computer to carry out the steps of:
   retrieving an actual target address for the current branch instruction; and
   determining whether the predicted target address for the current branch instruction matches the actual target address for the current branch instruction.

16. The computer program product of claim 15 further comprising computer program instructions that, when executed, cause the computer to carry out the steps of, responsive to determining that the predicted target address for the current branch instruction matches the actual target address for the current branch instruction, executing the instruction stored at the predicted target address for the current branch instruction.

17. The computer program product of claim 15 further comprising computer program instructions that, when executed, cause the computer to carry out the steps of, responsive to determining that the predicted target address for the current branch instruction does not match the actual target address for the current branch instruction, updating the entry in the branch prediction table that matches the execution path identifier to include the actual target address for the current branch instruction.

18. The computer program product of claim 13 further comprising computer program instructions that, when executed, cause the computer to carry out the steps of, responsive to failing to find an entry in the branch prediction table that matches the execution path identifier, adding an entry to the branch prediction table that includes the execution path identifier and an actual target address for the current branch instruction.

* * * * *